United States Patent Office 3,450,777
Patented June 17, 1969

3,450,777
PROCESS FOR PREPARING ALCOHOLS BY HYDRATION OF OLEFINS
Yukio Mizutani and Hirofumi Ihara, Tokuyama-shi, Japan, assignors to Tokuyama Soda Kabushiki Kaisha, Tokuyama-shi, Yamaguchi-ken, Japan, a corporation of Japan
No Drawing. Filed Sept. 20, 1965, Ser. No. 488,808
Claims priority, application Japan, Sept. 29, 1964, 39/54,792
Int. Cl. C07c 29/04, 35/00
U.S. Cl. 260—641    5 Claims A method for the preparation of alcohols by the hydration of olefins in the presence of a novel solid acid catalyst consisting essentially of the three elements zirconium tungsten and oxygen, the weight ratio of the constituents being within the range of Zr:W:O=1:2–8: 0.5–3.5.

This invention relates to a new catalyst for use in the hydration of olefins and to a process for preparing alcolols wherein this catalyst is used and the direct hydration of olefins is carried out.

Heretofore, as processes for preparing alcohols by the direct hydration of olefins, the following processes have been disclosed and are known; U.S. Patent 2,579,601 (1951) and the Chem. Eng. Progress 50, 526 (1954) disclose processes which use, for example, solid phosphoric acid as catalyst; U.S. Patent 2,658,924, a process which uses metal phosphates as catalyst; British Patents 646,284, and the Catalyst, 3, 191, published by Calalysis Society of Japan, (1961), ibid., 4, 73 (1962), a process which uses metal phosphates as calalyst; British Patent 646,284, 671,971, 622,937, U.S. Patents 2,807,655 and 2,815,391, processes which use oxides of tungsten as catalyst; Brenstaff-Chem. 38, 321 and 375 (1957), a process which uses silicotungstic acid as catalyst; U.S. Patent 2,477,380, Ind. & Eng. Chem. 53, 209 (1961), U.S. Patent 2,805,261 and Ind. & Eng. Chem. Process & Development 1, 296 (1962), processes which use ion exchange resins as catalyst.

The present invention provides a new catalyst comprising a solid acid whose principal constituent elements are zirconium, tungsten and oxygen. This invention also provides a process which uses this catalyst to prepare alcohols by the direct hydration of olefins.

Although the structure of the catalyst of the present invention is not known at the present time, it is a solid acid composed of zirconium, tungsten and oxygen as its principal constituent elements, the content of which by weight ratio is such that Zr:W:O comes within the range 1:2–8:0.5–3.5.

The present catalyst is insoluble in water, does not exhibit as strong an acidity as silica-alumina, and is stable to heat. In consequence of the possession of these characteristics, this catalyst has the advantage that its decrease in activity with the elapse of time is less than that of the heretofore-used catalysts such as solid phosphoric acid, silica-alumina and ion exchange resions.

As long as the solid acid to be used as catalyst in the present invention is one possessing the aforesaid composition, it is essentially effective. By way of illustration, its preparation will be given below.

An aqueous solution of at least one of either a water-soluble alkali metal salt or a water-soluble alkaline earth metal salt of tungstic acid, such as e.g., $Na_2WO_4$, $K_2WO_4$, $(NH_4)_2WO_4$ and $MgWO_4$ and an aqueous solution of water-soluble zirconium salt such as, e.g., $ZrO(NO_3)_2$, $ZrX_4$, $ZrOX_2$, (where X stand for Cl, Br or I) are mixed and reacted. The resulting precipitate is separated from the mother liquor washed and dried to yield the intended solid acid. In this case, the foregoing aqueous solution of the zirconium salt need only be just mixed. For example, the former may be added to the latter or vice versa. Alternatively, it is also possible to adopt a procedure of mixing the two continuously at a fixed rate. Further, for promoting the precipitation, it is preferred to make the mixed solution acidic with an inorganic or organic acid such as hydrochloric acid, nitric acid or oxalic acid. The use in this case of a suitable acid salt is of course possible. While said acid may be added in advance to the aqueous solution of the zirconium salt, it is preferred rather that its addition be made after the two solutions have been mixed. Further, its concentration should not be too high, about 0.1 N to 1 N being suitable for example.

Another method which is effective is one wherein a gel of zirconium hydroxide and a gel of tungstic acid are mixed and then dried or calcined. Again, a method wherein zirconium oxide is immersed in an aqueous solution of a metal salt of tungstic acid, followed by drying or calcining and then treating with an acid can also be practiced.

The invention catalyst can be prepared by following the procedures such as hereinabove described, but it is to be understood that the process for the preparation of the invention catalyst is not to be limited to those described. In fact the invention catalyst may be any solid acid which is composed essentially of zirconium, tungsten and oxygen, so long as its composition by weight ratio is 1:2–8:0.5–3.5.

The synthesis of this catalyst does not require any particular limitation as to temperature, the solid acid being obtained by completely reacting even at room temperature. However, when zirconium, one of the constituents of this catalyst, is substituted with a metal of the same group, such as titanium or silicon, the resulting catalyst, though possessing hydrating activity, has a lower activity than the present catalyst. Similarly, when chromium, molybdenum or phosphorus is used instead of tungsten, the activity obtainable is also lower.

The olefins used in the present invention include the aliphatic or cycloaliphatic olefins of 2 to 8 carbon atoms, particularly preferred being such as ethylene, propylene, butene, butene-2 and isobutene. That is to say, those olefins whose molecular weight is too high are not desirable, because of a rise in the volatilizing temperature and an increase in the hydrophobic property.

Further, the alcohols obtained by the invention process differ depending upon the position of the double bond of the olefins used. For example, when propylene is used, isopropyl alcohol is obtained. In the case butene-2 and octene-1 are used, sec-butyl and sec-octyl alcohols are obtained, respectively. On the other hand, when cyclohexene is used, the resulting alcohol is cyclohexanol.

The hydration reaction can be carried out in exactly the same manner as when the conventional catalysts have been used. For example, either the batchwise procedure wherein an autoclave is used and the olefins and water are contacted in the presence of the catalyst, or the continuous hydration method wherein the olefin and steam are contacted while being passed in a vapor or liquid phase through a fixed bed packed with the catalyst can be used. Alternatively, there is also a method of using a fluidized bed.

While the conditions of the hydration reaction will vary somewhat depending upon the class of olefin used, in general it is suitable to use 0.1 to 8 mols of water to 1 mol of the olefin. That is to say, if the amount of water is too little, the decline of the activity of the catalyst is fast, whereas if it is too great, the yield per unit time falls off. A reaction temperature of 100–300° C. is effective. When below 100° C., the reaction rate is slow, but on the other hand, if 300° C. is exceeded, the equilibrium value shifts to the feed stock side and not only is it impossible to expect a high yield, but there also is a tendency to setting up of side reactions. As regards the pressure of the reaction system, a pressure of above one atmosphere is sufficient for the reaction, but since the chemical equilibrium shifts to the product side as the pressure becomes higher, a reaction carried out under high pressure is effective for enhancing the conversion rate of the hydration reaction. However, since difficulties are encountered from the equipment standpoint when the pressure is raised too high and also since side reactions are set up, a pressure of up to 200 atmospheres is generally used.

Example 1

Twenty-five grams of $ZrOCl_2 \cdot 8H_2O$ are dissolved in 1500 ml. of water, to which are then added with stirring at room temperature (about 27° C.) a solution of 77 grams of $Na_2WO_4 \cdot 2H_2O$ in 540 ml. of water. The solution becomes turbid immediately. After stirring this for about 30 minutes, one liter of 1 N HCl is added. The mixture is stirred for another one hour, then allowed to stand still, after which the precipitate is separated by filtration, washed with water until no further acid is detected and thereafter dried at about 80° C. This is powdered and, after being molded into a suitable size, is used in the hydration reaction.

Example 2

An instance of the hydration of propylene by means of a W—Zr—O catalyst is illustrated below.

Into a glass tube having an inside diameter of 25 mm. and an effective length of 400 mm. and whose bottom end is closed is inserted a glass tube having an outside diameter of 19 mm. and whose bottom end is open. The annular portion formed between these two tubes is packed with 3 grams of catalyst molded to a diameter of 2–3 mm. and a length of 2–3 mm. The feed stock gases are each introduced in prescribed amounts via their respective meters into the outer glass tube from the top thereof and proceed downwardly. During this time the gases pass through the catalyst zone and then rise upwardly from the bottom of the inner glass tube to be taken out at the top thereof as a product gas. The heating is carried out from the outside, and the temperature is measured by inserting a thermocouple into the central part of the inner tube. The results obtained are tabulated below.

| Catalyst composition | | | Compounding ratio, W/Zr (mol ratio) | Temperature (° C.) | Pressure (atm.) | Propylene/ water (mol ratio) | SV [2] (cc./cc. hr.) | Alcohol concentration (wt. percent) | Propylene conversion (percent) |
|---|---|---|---|---|---|---|---|---|---|
| W (wt. percent) | Zr (wt. percent) | Others [1] (wt. percent) | | | | | | | |
| 52.3 | 18.7 | 29.0 | 1.5 | 165 | 1 | 0.5 | 3,700 | 1.8 | 1.2 |
| 54.2 | 12.8 | 33.0 | 2.0 | 160 | 1 | 0.5 | 3,700 | 2.2 | 1.4 |
| 57.0 | 10.0 | 33.0 | 3.0 | 160 | 1 | 0.5 | 3,700 | 2.5 | 1.6 |
| 62.4 | 8.9 | 28.7 | 4.0 | 160 | 1 | 0.5 | 3,700 | 1.8 | 1.2 |

[1] Others is principally oxygen, though a small amount of hydrogen is also contained. [2] SV is the space velocity under the reaction conditions.

Example 3

An instance of the hydration of propylene under pressure is illustrated below.

A stainless steel reaction tube having an inside diameter of 25 mm. and a length of 400 mm. is used, wherein at its top and bottom ends are placed glass balls and the intermediate portion is filled with 3 grams of the catalyst molded into a size 2–3 mm. in diameter and 2–3 mm. in length. The feed stock propylene is introduced under pressure into a saturating device where it is heated and brought up to the desired pressure as well as saturated with water, and then introduced into the top end of the reactor. The product is taken out from the bottom and submitted to an analysis by means of gas chromatography. The results obtained are tabulated below.

| Catalyst composition | | | Compounding ratio, W/Zr (mol ratio) | Temperature (° C.) | Pressure (atm.) | Propylene/ water (mol ratio) | SV (cc./cc. hr.) | Isopropylalcohol concentration (wt. percent) |
|---|---|---|---|---|---|---|---|---|
| W (wt. percent) | Zr (wt. percent) | Others (wt. percent) | | | | | | |
| 52.3 | 18.7 | 29.0 | 1.5 | 180 | 5 | 0.5 | 780 | 2.8 |
| 54.2 | 12.8 | 33.0 | 2.0 | 180 | 5 | 0.5 | 780 | 3.9 |
| 57.0 | 10.0 | 33.0 | 3.0 | 180 | 5 | 0.5 | 780 | 5.0 |
| 57.0 | 10.0 | 33.0 | 3.0 | 180 | 5 | 1.0 | 780 | 6.0 |
| 57.0 | 10.0 | 33.0 | 3.0 | 180 | 5 | 1.5 | 780 | 6.5 |
| 57.0 | 10.0 | 33.0 | 3.0 | 200 | 10 | 1.0 | 380 | 8.0 |
| 57.0 | 10.0 | 33.0 | 3.0 | 200 | 10 | 1.5 | 380 | 6.8 |

Example 4

An instance of the hydration of propylene under pressure (autoclave) is illustrated below.

A magnetic top-and-bottom agitating type 500 cc. stainless steel autoclave is employed and 3.0 grams of the catalyst prepared in Example 1 are used. After charging 100–200 cc. of water into the autoclave and introducing propylene gas under pressure, the temperature is brought up to the desired point and then the stirring is begun. The catalyst is secured to the stirring rod and by raising and lowering this rod, the contact of the catalyst alternately with the gas and liquid phases is accomplished. The results obtained are tabulated below.

| Catalyst composition | | | Compounding ratio, W/Zr (mol ratio) | Temperature (° C.) | Pressure (atm.) | Propylene/ water (mol ratio) | Time (hr.) | Isopropylalcohol concentration (wt. percent) |
|---|---|---|---|---|---|---|---|---|
| W (wt. percent) | Zr (wt. percent) | Others (wt. percent) | | | | | | |
| 54.2 | 12.8 | 33.0 | 2.0 | 220 | 100 | 0.14 | 4.5 | 6.6 |
| 54.2 | 12.8 | 33.0 | 2.0 | 220 | 100 | 0.21 | 4.5 | 7.6 |

Example 5

An instance of the hydration of ethylene is illustrated below.

The apparatuses of Example 2 or Example 3 are employed and the same procedures are followed. The amount of catalyst used is 3 grams. The results obtained are tabulated below.

| Catalyst composition | | | Compounding ratio, W/Zr (mol ratio) | Temperature (° C.) | Pressure (atm.) | Ethylene/ water (mol ratio) | Ethylalcohol concentration (wt. percent) | Apparatus used |
|---|---|---|---|---|---|---|---|---|
| W (wt. percent) | Zr (wt. percent) | Others (wt. percent) | | | | | | |
| 57.0 | 10.0 | 33.0 | 3.0 | 225 | 1 | 1.5 | 0.52 | That used in Example 2. |
| 57.0 | 10.0 | 33.0 | 3.0 | 260 | 5 | 0.5 | 0.7 | That used in Example 3. |

Example 6

An instance of the hydration of 1-butene is illustrated below.

The apparatus of Example 2 is used and the same procedures are followed. The amount of catalyst used is 3 grams. The results obtained are tabulated below.

Catalyst composition:
- W (wt. percent) -------------------- 54.2
- Zr (wt. percent) ------------------- 12.8
- Others (wt. percent) --------------- 33.0
- Compounding ratio—W/Zr (mol ratio) -- 2.0
- Temperature (° C.) ----------------- 160
- Pressure (atm.) -------------------- 1
- Butene/water (mol ratio) ----------- 1
- Alcohol concentration (wt. percent) - 0.9

We claim:

1. A process for preparing alcohols which comprises contacting with water or steam at a temperature 100–300° C. at least one olefin selected from the group consisting of unsubstituted aliphatic and cycloaliphatic monoolefins of two to eight carbon atoms, using a solid acid catalyst, consisting essentially of the elements zirconium, tungsten and oxygen, the weight ratio composition of said constituents being within a range of $Zr:W:O=1:2-8:0.5-3.5$.

2. The process according to claim 1 which comprises contacting with water or steam at a temperature 100–300° C. at least one olefin selected from the group consisting of ethylene, propylene and butene, using a solid acid catalyst, the principal constituent elements of said acid being zirconium, tungsten and oxygen, the weight ratio composition of said constituents being within a range of $Zr:W:O=1:2-8:0.5-3.5$.

3. The process according to claim 1 which comprises directly contacting with water or steam an olefin selected from the group consisting of the aliphatic and cycloaliphatic olefins 2 to 8 carbon atoms, using a solid acid catalyst resulting from the reaction between a water-soluble tungstic acid salt and a zirconium salt.

4. The process according to claim 1 which comprises directly reacting with water or steam an olefin selected from the aliphatic and cycloaliphatic olefins of two to eight carbon atoms, using a solid acid catalyst obtained by reacting at least one tungstic acid salt selected from $Na_2WO_4$, $KK_2WO_4$, $(NH_4)_2WO_4$ and $MgWO_4$ with at least one zirconium salt selected from $ZrO(NO_3)_2$, $ZrX_4$ and $ZrOX_2$, where X stands for a member selected from Cl, Br and I, said salts being reacted in a mole ratio of $W:Zr=1-4:1$.

5. The process according to claim 1 which comprises directly reacting with water or steam at a temperature 100–300° C. and a pressure ranging between normal atmospheric pressure and 200 atmospheres, at least one olefin selected from the group consisting of ethylene, propylene and butene, using a solid acid catalyst resulting from the reaction between a water-soluble tungstic acid salt and a zirconium salt.

References Cited

UNITED STATES PATENTS

| | | | |
|---|---|---|---|
| 1,738,785 | 12/1929 | McKee et al. | 260—641 |
| 2,755,309 | 7/1956 | Reynolds et al. | 260—641 |
| 2,846,365 | 8/1958 | Gladrow | 252—469 |

FOREIGN PATENTS

| | | |
|---|---|---|
| 555,350 | 4/1958 | Canada. |
| 78,316 | 6/1955 | Netherlands. |

LEON ZITVER, *Primary Examiner.*

J. E. EVANS, *Assistant Examiner.*

U.S. Cl. X.R.

252—469; 260—617, 631

UNITED STATES PATENT OFFICE
CERTIFICATE OF CORRECTION

Patent No. 3,450,777                                          June 17, 1969

Yukio Mizutani et al.

It is certified that error appears in the above identified patent and that said Letters Patent are hereby corrected as shown below:

Column 1, line 15, "elefins" should read -- olefins --; line 31, beginning with "acid as catalyst;" cancel all to and including "catalyst." in line 43, same column 1, and insert > acid as catalyst; U.S. Patent 2,658,924, a process which used silica-alumina as catalyst; British Patent 368,935 and the Catalyst, 3, 191, published by Catalysis Society of Japan, (1961), ibid., 4, 73 (1962), a process which uses metal sulfates as catalyst; British Patent 369,216, a process which uses metal phosphates as catalyst; British Patent 646,284, 671,971, 622,937, U.S. Patent 2,807,655 and 2,815,391, processes which use oxides of tungsten as catalyst; Brennstaff-Chem. 38, 321 and 375 (1957), a process which uses silicotungstic acid as catalyst; U.S. Patent 2,477,380, Ind. & Eng. Chem. 53, 209 (1961), U.S. Patent 2,805,261 and Ind. & Eng. Chem. Process & Development 1, 296 (1962), processes which use ion exchange resins as catalyst.

same column 1, line 62, "resions" should read -- resins --. Column 2, line 4, after "aqueous" insert -- of the tungstic acid salt and the aqueous --. Column 6, line 8, "KK$_2$WO$_4$" should read -- K$_2$WO$_4$ --.

Signed and sealed this 21st day of April 1970.

(SEAL)
Attest:

EDWARD M. FLETCHER, JR.                        WILLIAM E. SCHUYLER, JR.
Attesting Officer                                       Commissioner of Patents